United States Patent
West et al.

(10) Patent No.: US 11,090,778 B2
(45) Date of Patent: Aug. 17, 2021

(54) METHODS AND SYSTEMS FOR CENTRIFUGAL CASTING OF POLYMER POLISH PADS AND POLISHING PADS MADE BY THE METHODS

(71) Applicant: Thomas West, Inc., Sunnyvale, CA (US)

(72) Inventors: Thomas West, Portola Valley, CA (US); Peter McKeever, Sunnyvale, CA (US); Kevin Song, San Jose, CA (US); Donald Dietz, Mountain View, CA (US); Long Nguyen, San Jose, CA (US); Matt Richardson, Milpitas, CA (US)

(73) Assignee: Thomas West, Inc., Sunnyvale, CA (US)

( * ) Notice: Subject to any disclaimer, the term of this patent is extended or adjusted under 35 U.S.C. 154(b) by 84 days.

(21) Appl. No.: 13/854,856

(22) Filed: Apr. 1, 2013

(65) Prior Publication Data
US 2013/0260657 A1    Oct. 3, 2013

Related U.S. Application Data

(60) Provisional application No. 61/619,328, filed on Apr. 2, 2012.

(51) Int. Cl.
*B24B 37/24*    (2012.01)
*B24B 37/26*    (2012.01)
(Continued)

(52) U.S. Cl.
CPC .............. *B24B 37/24* (2013.01); *B24B 37/26* (2013.01); *B24D 11/005* (2013.01); *B24D 18/00* (2013.01);
(Continued)

(58) Field of Classification Search
CPC .......... B24B 37/22; B24B 37/24; B24B 37/26; B24D 3/28; B24D 11/003; B24D 11/005;
(Continued)

(56) References Cited

U.S. PATENT DOCUMENTS 2,870,054 A * 1/1959 Strickland ............... B29C 41/00
156/74
3,253,070 A * 5/1966 Gerson ................. B29C 41/042
264/108

(Continued)

FOREIGN PATENT DOCUMENTS

| CN | 1460055 A | 12/2003 |
| CN | 1675063 A | 9/2005 |

(Continued)

OTHER PUBLICATIONS

International Search Report, dated Jul. 9, 2013, Application No. PCT/US2013/034858, filed Apr. 1, 2013.
(Continued)

*Primary Examiner* — Michael D Jennings
*Assistant Examiner* — Marcel T Dion
(74) *Attorney, Agent, or Firm* — Carr & Ferrell LLP (57) ABSTRACT

A method for making a polishing pad includes rotating a cylinder about a central axis. The cylinder encloses in an interior space a polymer mixture. The method also includes forming the polishing pad from at least some of a polymer formed after the polymer mixture has gelled. The rotating of the cylinder may be continued until the polymer has cured. The method may include forming at least two distinct layers in the polishing pad by casting and gelling sequentially at least two different polymer mixtures. A system for manufacturing a polishing pad includes a centrifugal caster adapted to rotate. A polishing pad made by a method is provided.

21 Claims, 5 Drawing Sheets

(51) Int. Cl.
    *B24D 18/00*     (2006.01)
    *B24D 11/00*     (2006.01)
    *B29C 41/04*     (2006.01)

(52) U.S. Cl.
    CPC ........ *B24D 18/0009* (2013.01); *B29C 41/042* (2013.01)

(58) Field of Classification Search
    CPC ..... B24D 18/009; B29C 41/04; B29C 41/042; B29C 41/047
    USPC .......................................... 451/527, 532, 533
    See application file for complete search history.

(56) References Cited

U.S. PATENT DOCUMENTS

| | | | | |
|---|---|---|---|---|
| 4,762,751 | A * | 8/1988 | Girgis | B32B 27/12 428/375 |
| 4,808,364 | A * | 2/1989 | Blunt | B01J 19/28 264/310 |
| 5,039,297 | A * | 8/1991 | Masters | B29C 41/06 264/310 |
| 5,681,612 | A * | 10/1997 | Benedict | B24D 3/28 427/202 |
| 5,713,120 | A | 2/1998 | Watabe et al. | |
| 6,171,181 | B1 | 1/2001 | Roberts et al. | |
| 6,267,917 | B1 | 7/2001 | Guzikowski et al. | |
| H1987 | H * | 8/2001 | Brink | C08J 5/10 524/321 |
| 6,392,206 | B1 * | 5/2002 | Von Arx | A47G 19/2288 219/468.1 |
| 6,406,363 | B1 * | 6/2002 | Xu | B24B 37/205 451/296 |
| 6,422,921 | B1 | 7/2002 | Ettinger | |
| 6,641,471 | B1 | 11/2003 | Pinheiro et al. | |
| 6,752,690 | B1 | 6/2004 | Fruitman | |
| 6,857,941 | B2 | 2/2005 | Emami et al. | |
| 6,884,156 | B2 | 4/2005 | Prasad et al. | |
| 6,905,402 | B2 | 6/2005 | Allison et al. | |
| 7,275,928 | B2 | 10/2007 | Kolesar et al. | |
| 7,414,080 | B2 | 8/2008 | Kulp | |
| 8,257,545 | B2 | 9/2012 | Loyack et al. | |
| 9,156,124 | B2 | 10/2015 | Allison et al. | |
| 10,022,842 | B2 | 7/2018 | West et al. | |
| 10,722,997 | B2 | 7/2020 | West et al. | |
| 2002/0068513 | A1 * | 6/2002 | Xu | B24B 37/205 451/41 |
| 2002/0081946 | A1 | 6/2002 | Scott et al. | |
| 2002/0084547 | A1 | 7/2002 | Naus et al. | |
| 2003/0090024 | A1 * | 5/2003 | Skov | B29C 33/44 264/157 |
| 2003/0181155 | A1 | 9/2003 | West et al. | |
| 2004/0005423 | A1 * | 1/2004 | Dalton | B29C 39/006 428/36.9 |
| 2004/0023767 | A1 * | 2/2004 | Kato et al. | 492/59 |
| 2004/0055223 | A1 * | 3/2004 | Ono | B24B 37/22 51/293 |
| 2004/0096608 | A1 * | 5/2004 | King et al. | 428/35.7 |
| 2004/0113322 | A1 * | 6/2004 | Grimmer | B29C 39/04 264/402 |
| 2004/0134792 | A1 * | 7/2004 | Butterfield et al. | 205/640 |
| 2004/0149733 | A1 * | 8/2004 | Abbott | B29C 33/02 219/535 |
| 2004/0224611 | A1 | 11/2004 | Aoi et al. | |
| 2004/0248508 | A1 * | 12/2004 | Lombardo | B24B 21/04 451/537 |
| 2004/0259484 | A1 | 12/2004 | Prasad et al. | |
| 2005/0107007 | A1 * | 5/2005 | Furukawa | B24B 37/24 451/41 |
| 2005/0129921 | A1 * | 6/2005 | Laws | A23G 3/0029 428/304.4 |
| 2005/0136206 | A1 * | 6/2005 | Cormier | B29C 41/003 428/36.91 |
| 2005/0171224 | A1 | 8/2005 | Kulp | |
| 2005/0197050 | A1 | 9/2005 | Prasad et al. | |
| 2005/0218548 | A1 * | 10/2005 | Preston et al. | 264/50 |
| 2006/0052040 | A1 * | 3/2006 | Prasad | B24B 37/24 451/41 |
| 2006/0088622 | A1 * | 4/2006 | Persico | B29C 41/04 425/435 |
| 2007/0066195 | A1 | 3/2007 | Duong | |
| 2007/0141312 | A1 * | 6/2007 | James | B24B 37/22 428/212 |
| 2007/0144074 | A1 | 6/2007 | Petersen | |
| 2007/0275229 | A1 | 11/2007 | Laws et al. | |
| 2008/0207100 | A1 * | 8/2008 | Roy et al. | 451/529 |
| 2008/0241455 | A1 * | 10/2008 | DiNello | B32B 3/26 428/58 |
| 2008/0274674 | A1 | 11/2008 | Prasad et al. | |
| 2008/0291771 | A1 * | 11/2008 | Khouri | B28C 5/4268 366/59 |
| 2009/0043398 | A1 | 2/2009 | Yakimicki et al. | |
| 2009/0075568 | A1 * | 3/2009 | Kimura | B24B 37/26 451/59 |
| 2010/0001425 | A1 * | 1/2010 | Pop-Iliev | B29C 41/04 264/45.7 |
| 2010/0063172 | A1 * | 3/2010 | Negle | B29C 39/006 521/142 |
| 2010/0087128 | A1 * | 4/2010 | Nakayama | B24B 37/24 451/548 |
| 2010/0112919 | A1 * | 5/2010 | Bonner | B24B 21/004 451/493 |
| 2010/0175810 | A1 * | 7/2010 | Korwin-Edson | C08F 265/04 156/71 |
| 2010/0178414 | A1 | 7/2010 | Judge et al. | |
| 2011/0021123 | A1 | 1/2011 | Kulp et al. | |
| 2011/0038975 | A1 * | 2/2011 | Park | G02B 6/0035 425/143 |
| 2011/0070005 | A1 * | 3/2011 | Mizumo | G03G 15/2053 399/333 |
| 2011/0159793 | A1 | 6/2011 | Pai et al. | |
| 2011/0221089 | A1 | 9/2011 | Pop-Iliev et al. | |
| 2011/0265515 | A1 * | 11/2011 | Hernandez Delsol | C03B 23/0258 65/29.18 |
| 2012/0070586 | A1 * | 3/2012 | Seko | G03G 15/0233 427/385.5 |
| 2012/0302148 | A1 * | 11/2012 | Bajaj | B24B 37/205 451/527 |
| 2012/0315830 | A1 | 12/2012 | Joseph et al. | |
| 2014/0287663 | A1 | 9/2014 | West et al. | |
| 2015/0231766 | A1 | 8/2015 | West et al. | |
| 2017/0203411 | A9 | 7/2017 | West et al. | |
| 2018/0036919 | A1 | 2/2018 | Zhang et al. | |
| 2018/0311791 | A1 | 11/2018 | West et al. | |

FOREIGN PATENT DOCUMENTS

| | | |
|---|---|---|
| CN | 101106905 A | 1/2008 |
| JP | 200042901 A | 2/2000 |
| JP | 2001-277304 | 10/2001 |
| JP | 2003-001565 | 1/2003 |
| JP | 2005322790 A | 11/2005 |
| KR | 10-0771562 | 10/2007 |
| KR | 10-2010-0041160 | 4/2010 |
| KR | 10-2010-0096718 | 9/2010 |
| KR | 101021783 B1 | 3/2011 |
| KR | 1020150002734 A | 1/2015 |
| KR | 1020160124208 | 10/2016 |
| KR | 102100654 B1 | 4/2020 |
| SG | 11201610107 T | 3/2019 |
| SG | 10201807026 | 9/2020 |
| TW | 340082 | 9/1998 |
| TW | 200505635 A | 2/2005 |
| TW | 200530382 A | 9/2005 |
| TW | 200640612 A | 12/2006 |
| TW | I295949 B | 4/2008 |
| TW | I311512 B | 7/2009 |
| TW | 200946279 A | 11/2009 |
| TW | 201121710 A | 7/2011 |
| TW | I359718 B | 3/2012 |

(56) References Cited

FOREIGN PATENT DOCUMENTS

| TW | 102111787 | A | 1/2014 |
|---|---|---|---|
| TW | 201402275 | A | 1/2014 |
| TW | 201534430 | A | 9/2015 |
| TW | 201607643 | A | 3/2016 |
| TW | I647066 | B | 1/2019 |
| TW | I665033 | | 7/2019 |
| TW | I671161 | | 9/2019 |
| WO | 2013151946 | | 10/2013 |
| WO | WO2015127077 | A1 | 8/2015 |
| WO | WO2015187338 | A1 | 12/2015 |

OTHER PUBLICATIONS

International Search Report and Written Opinion dated Jul. 9, 2013 in PCT Application US2013/034858.
Non-Final Office Action, dated Oct. 5, 2016, U.S. Appl. No. 14/626,256, filed Feb. 19, 2015.
Advisory Action, dated Nov. 18, 2016, U.S. Appl. No. 14/297,177, filed Jun. 5, 2014.
Taiwan Patent Application No. 104105866, "Notice of Request for Submission of Argument," Oct. 3, 2016, 8 pages [12 pages including translation].
Patent Cooperation Treaty Application No. PCT/US2015/016615, "International Search Report" and "Written Opinion" dated May 20, 2015.
Patent Cooperation Treaty Application No. PCT/US2015/030903, "International Search Report" and "Written Opinion" dated Sep. 4, 2015.
Singapore Patent Application No. 11201406287Q, "Office Action," dated Nov. 2, 2015.
Non-Final Office Action, dated Jan. 11, 2017, U.S. Appl. No. 14/297,177, filed Jun. 5, 2014.
Taiwan Patent Application No. 102111787, "Office Action," dated Jan. 11, 2017, 22 pages.
"Office Action," Taiwan Patent Application No. 104105866, dated May 17, 2017, 5 pages [8 pages including translation].
"Office Action," Singapore Patent Application No. 11201606734R, dated Jul. 11, 2017, 7 pages.
Non-Final Office Action, dated Sep. 18, 2017, U.S. Appl. No. 14/626,256, filed Feb. 19, 2015.
"Office Action," Taiwan Patent Application No. 102111787, dated Dec. 11, 2017, 6 pages [15 pages including translation].
"Search Report," Singapore Patent Application No. 10201608125W, dated Apr. 9, 2018, 5 pages.
"Office Action," Singapore Patent Application No. 11201610107T, dated Dec. 14, 2017, 6 pages.
"Office Action," Taiwan Patent Application No. 104117524, dated Sep. 3, 2018, 16 pages [21 pages including translation].
"Notice of Allowance," Taiwan Patent Application No. 104105866, dated Nov. 2, 2018, 3 pages.
"Notice of Allowance," Singapore Patent Application No. 11201610107T, dated Dec. 6, 2018, 6 pages.
"Office Action," Korean Patent Application No. 10-2014-7030712, dated May 3, 2019, 10 pages [20 pages including translation].
"Notice of Allowance," Taiwan Patent Application No. 102111787, dated May 23, 2019, 3 pages.
"Notice of Allowance," Taiwan Patent Application No. 104117524, dated Mar. 22, 2019, 3 pages.
"Notice of Allowance," Korean Patent Application No. 10-2014-7030712, dated Mar. 18, 2020, 3 pages [4 pages including translation].
"Office Action," Singapore Patent Application No. 10201807026V, dated Aug. 2, 2019, 9 pages.
"Office Action," Singapore Patent Application No. 10201608125W, dated Dec. 12, 2019, 5 pages.
"Notice of Allowance," Singapore Patent Application No. 10201807026V, dated Jul. 6, 2020, 5 pages.

\* cited by examiner

METHODS AND SYSTEMS FOR CENTRIFUGAL CASTING OF POLYMER POLISH PADS AND POLISHING PADS MADE BY THE METHODS

CROSS-REFERENCE TO RELATED APPLICATIONS

This application claims the benefit of U.S. Provisional Application No. 61/619,328, filed on Apr. 2, 2012, which is incorporated by reference herein.

FIELD OF THE INVENTION

The present invention relates generally to polishing pads used for creating a smooth planar surface on a wide range of substrates such as glass, semiconductor wafers, metals, dielectrics, magnetic and optics. More specifically, the present invention relates to a method and system for casting polymer polishing pads using a centrifugal caster. The present invention also relates to the properties of the polymer polishing pad formed using a centrifugal caster.

BACKGROUND

Polishing is a process step which is commonly used in the manufacture of semiconductor, hard disk drive and optical products. The polishing process generally consists of rubbing a substrate against a polymer pad, or vice versa. A chemical solution, usually containing fine particles (the slurry), is present at the interface between the substrate and the polymer pad. The polymer pad may consist of a single layer or multiple layers stacked on each other. The layers are bonded to each other using adhesive. The layer that polishes is referred to as the polish layer, top pad or pad surface. The top pad material itself is typically based upon polyurethane, though a wide range of other polish pad materials are viable. Both open and closed microcellular pads, non-cellular pads (solid pads), fiber pads of both woven and nonwoven construction, filled pads employing embedded abrasive are or have been used to polish substrates. Flow channels may be provided on the polish surface of the polymer polish pad. These flow channels have many functions but are primarily used to improve slurry flow to ensure the presence of slurry on all areas of the polymer polish pad. The flow channels also result in higher contact pressure during the polishing process which can increase the rate of polish on the substrate. Also, the flow channels can be used to accelerate pad rinsing after the polish step has finished. These flows channels can be considered as a macro texture on the polish pad. The macro texture is typically applied prior to use of the polymer polish pad.

During the polish process, or between substrate polishing, a micro texture is formed on the surface of the polymer polish pad. The process of forming such a micro texture is most commonly referred to as conditioning. By conditioning the pad surface at such a high frequency it is possible to maintain a consistent micro texture on the polymer pad surface. This is important to maintain consistent polish performance because the micro texture creates mini flow channels for the slurry between the polymer pad surface and the substrate. During polishing, the afore-mentioned flow channels and the micro texture form a symbiotic relationship in ensuring good fluid dynamics during polishing.

It is most common to perform conditioning of the polymer polish pad using a diamond conditioner. Diamond size, shape, density and protrusion level are altered to produce different diamond conditioner capabilities. It is important when developing a polish process that the correct diamond conditioner configuration is used to obtain the optimum polish performance from the type of polymer polish pad employed.

SUMMARY OF THE INVENTION

A method for making a polishing pad includes rotating a cylinder about a central axis. The cylinder encloses in an interior space a polymer mixture (also referred to herein as a polymer precursor or a polyurethane prepolymer mixture). The method also includes forming the polishing pad from at least some of a polymer formed after the polymer mixture has gelled.

The rotating of the cylinder may be continued until the polymer has gelled. The method may include forming two or more distinct layers in the polishing pad by casting and gelling sequentially at least two different polymer layers. The layers may be formed from gelling the same polymer mixture or different polymer mixtures in some or all of the layers.

The method may include heating the cylinder to a temperature between 50 and 500 degrees Fahrenheit during at least a portion of a time of the rotating operation. The temperature may be between about 140 and 212 degrees Fahrenheit.

The polymer precursor may include a polyurethane, a polyuria-urethane, a polycarbonate, a polyamide, a polyacrylate and/or a polyester.

The method may include mixing a diisocyanate, a difunctional isocyanate and/or a polyfunctional isocyanate with a first polyol to form the polymer precursor. The method may also include dispensing the polymer precursor into the interior space of the cylinder.

The method may include adding a filler, microelements, abrasives, fibers, surfactants and/or a plasticizer into the polymer precursor.

The method may include treating a surface of the interior space of the cylinder with a mold release agent prior to dispensing the polymer mixture into the interior space. The method may include removing at least some of the polymer from the interior space of the cylinder after the polymer has gelled.

A system for manufacturing a polishing pad includes a centrifugal caster adapted to rotate. The centrifugal caster defines a cylindrical interior space. The system also includes a dispenser adapted to introduce a polymer mixture into the centrifugal caster. The polishing pad may be formed from at least some of a polymer formed after the polymer mixture has gelled.

The system may include a mixer adapted to mix at least a first diisocyanate and a first polyol to form the polymer precursor.

The centrifugal caster may be adapted to heat the polymer precursor. A surface of the cylindrical interior space may include a texture adapted to impart to the polymer a groove texture to a working surface of the polishing pad and/or a perforation delineating an outer edge of the polishing pad. Additionally or alternatively, the texture may be adapted to impart to the polymer a roughened texture to a backside of the polishing pad opposite the working surface to improve adhesion between the polishing pad and an adhesive.

A polishing pad made by a method is provided. The method includes rotating a cylinder about a central axis. The method may include forming grooves in a surface of the polishing pad. The method may include mixing at least two components to form the polymer precursor, and introducing the polymer precursor into an interior of the cylinder.

The polishing pad may be substantially flat, substantially homogenous and/or transparent. The polishing pad may be substantially absent of pores in a majority of a cross-sectional cut and greater than 20 mils thick. The polishing pad may be between 20 Shore A to 90 Shore D in hardness, may be opaque, and/or may be anisotropic. The method may include placing a fiber network on the polymer mixture prior to being fully gelled, and subsequently forming an additional layer on top of the network.

DETAILED DESCRIPTION OF EXEMPLARY EMBODIMENTS

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated. According to exemplary embodiments, the present technology relates generally to polish pads. More specifically, the present invention provides a system and method for making solid homogenous polymer polish pads.

Polishing within the semiconductor industry is referred to as Chemical Mechanical Planarization (CMP). For many years now polymer polish pads used for CMP are primarily closed cell polyurethane materials. A small percentage of polish pads used for CMP employ open cell, fiber impregnated with polymer or polymer filled with abrasive type polish pads. The surface of such pads contains a micro texture. This inherent micro texture complements the conditioning process and ultimately the polish performance of the pad. Inconsistencies in this inherent micro structure lead to deviations in the polish performance of the pad. For this reason pad manufacturers have worked to refine pad manufacturing processes to reduce the variation in their products. In contrast, a solid homogenous polymer polish pad contains no inherent micro structure. Instead it relies on the conditioning process during use to impart a micro texture on the pad surface.

Conventional top pad closed cell material manufacturing processes employ the use of one of the following processes: 1. Thermoplastic injection molding, 2. Thermoset injection molding (often referred to as "reaction injection molding" or "RIM"), 3. Thermoplastic or thermoset injection blow molding, 4. Compression molding, and 5. A similar process in which a material is positioned and solidified. Such methods could be described as using closed cast systems.

Centrifugal casting involves pouring a liquid into a cylindrical mold spinning about its axis of symmetry. The mold is kept rotating until the material has solidified. The present technology provides for the use of a centrifugal caster employed to manufacture polymer polish pads. A centrifugal caster may be described as an open cast method.

Centrifugal casting technology is used for manufacturing iron pipes, bushings, wheels, and other parts possessing axial symmetry. In centrifugal casting of metals, a permanent mold is rotated about its axis at high speeds (300 to 3000 RPM) as the molten metal is poured. The molten metal is centrifugally thrown towards the inside mold wall, where it solidifies after cooling. Typical metal materials that can be cast with this process are iron, steel, stainless steels, and alloys of aluminum, copper and nickel.

Centrifugal casting may also be employed for the manufacture of polymer parts. For example, polyurethane timing belts for special applications may be produced using centrifugal casting. The belts have special coatings and reinforcing to suit specific transmission applications. The belts are one piece molded and are formed using centrifugal casting process and high performance polyurethane. The belts may have embedded steel, Kevlar®, polyester, stainless steel or glass fiber reinforcing. The belts may be used with linear drives in applications like packaging, sorting, and assembly machines.

The preparation of the raw materials needed to manufacture a polymer polish pad requires significant control to ensure consistent raw material ratios are input to the mixture. The raw materials may need to be heated separately before mixing. In addition, the raw materials may preferably be mixed thoroughly to result in even dispersion within the mixture. The materials may foam upon mixing, and as a result may need to be passed through a system to eliminate the foam. Furthermore, the material then needs to be transferred to a mold before gelling starts. This process can be further complicated when the "pot life" of the mixture is short. If the "pot life" is exceeded, then the mixture will begin to cure and is no longer useful.

For the formation of a solid homogenous polymer polish pad this process has the added concern of preventing the formation of pores in the solid layer. This is particularly troubling when the "pot life" is short. The often means that use of conventional closed cast systems to make such a solid homogenous polymer polish pad comes with many restrictions and in some cases such closed cast systems cannot be used. For example, the material thickness usually needs to be much greater than the allowable polish pad in order to ensure the mixture can fill the cast. This adds economic burden to the pad manufacturing process by increasing waste. The yield of the molding process can be impacted by the tight window of production, and the loss of yield also adds an economic burden to the pad manufacturing process. Inconsistencies can also be seen to develop in the material as a result of the tight window for production.

According to the present technology, a solid homogenous polymer polish pad is produced using centrifugal casting. This process involves introducing the polymer mixture, which may be a liquid, into a large rotating drum. The centrifugal force expels the polymer mixture against the inner surface of the drum, and when the polymer mixture gels and becomes solid, a rectangular belt of solid homogenous polymer may be obtained. When the polymer mixture is introduced into the spinning drum of the centrifugal caster, the polymer mixture material fans out and adheres to the walls of the drum. When the polymer mixture has gelled cured and solidified, there are substantially no pores across a majority of the material cross section. Any pores present will be isolated to the surface of the sheet which is opposite or furthest from the interior wall of the drum, and therefore may be easily eliminated during formation, preparation and/or conditioning.

Centrifugal casting to make a solid homogenous polymer sheet enables the manufacture of a polish pad that is free of voids. In addition, the process may be adjusted to ensure that the total thickness variation (TTV) of the material will be very small. The temperature and speed (RPM) of a centrifugal caster used to make a polish pad may be altered depending on the desired pad characteristics and the type of polymer precursor being used.

The centrifugal casting system and method provided herein allows the formation of a thin sheet of solid homogenous polymer with low TTV. A thin sheet of polymer (for example, polyurethane) can be easily converted to a solid polymer polish pad which is absent of voids or pores.

The centrifugal casting system and method provided herein ensures the formation of a solid polish pad without the presence of pores or voids caused by a polymer mixture preparation, even a fast gelling (or short "pot life") polymer mixture. More specifically, the present technology allows the unrestrictive formation of a solid homogenous polymer pad with short "pot life" polymer mixtures, and can eliminate the need to pass the polymer mixture through a system to remove the foam that may form during mixing of the polymer mixtures.

The present technology enables the formation of a multilayer polish pad with different polymer formulations, and can be used to induce phase separations when precursor mixtures contain fillers, abrasives and/or fibers. Furthermore, the present technology may be used to induce predetermined or desirable anisotropic chain structure in the polymer sheets.

An inner surface of the caster may be smooth, or alternatively a texture may be used to add grooves or channels to a working surface of the polish pad, to improve the performance of the adhesive used in the polish pad construction.

Heating during centrifugal casting may be performed by heating elements that surround or are adjacent to the casting drum, which heat the drum and the air in the drum. Typically, the drum is pre-heated prior to introduction of the polymer precursor. Additional processes may be added to the casting operation to improve product performance.

The presence of an inherent micro texture in the pad material may enhance the polish performance of the polish pad. Such micro texture may need to be consistent within the pad material to prevent inconsistent polish performance. A solid homogenous pad relies exclusively on the micro texture introduced during conditioning. Should a pore or pores be present in the pad material, then this may lead to an increased level of polish rate. This increased level of polish rate will not be sustainable because the pores are not consistently present in the layer. For this reason it is important that a solid homogenous polish pad contain few or no pores. Efforts to manufacture solid homogenous polymer pads without pores have been largely ineffective. By contrast, the use of a centrifugal caster overcomes the issues with polymer mixtures, while ensuring void-free polymer sheets, even with short "pot life" polymer mixtures. The centrifugal caster reduces or eliminates pores or voids in the polymer sheet because centrifugal force drives the precursor material to the interior wall of the caster, while any pores of voids would migrate to the opposite surface. This is possible because the pores or voids are lighter than the polymer mixture.

Bubbles migrate to the surface during hardening of the polymer, and may remain on the surface after hardening. These bubbles can be machined away by machining the interior surface of the belt, which may be used as the working surface of the polishing pad. This machining may be typically between 1 and 4 thousandths of an inch, or alternatively $15/1000$ of an inch.

Centrifugal casting of solid homogenous polymer sheet provides the unexpected benefit of generating an exceptionally flat polymer sheet. Extreme flatness reduces the requirement for machining, and consequently avoids loss of stock and the time and expense of machining. Second, the technique reduces or eliminates pores in the polymer cast because the polymer precursor migrates to the drum surface due to the centrifugal force, while the pores don't migrate and consequently are pressed out of the polymer precursor. The substantial absence of pores provides a consistent polishing pad (also referred to as a CMP pad, though alternative polishing applications are encompassed by this disclosure) from initial use to final use. A polishing pad may be eighty thousandths of an inch thick or thinner, and as the pad is used it gets thinner.

The polymer polish pad formed by centrifugal casting may be substantially or completely free of pores or voids, and may be substantially uniform in thickness. A polymer sheet may be formed using a short "pot life" precursor but which also may be substantially or completely free of pores. Consequently, a very high manufacturing throughput may be achieved utilizing the present technology since the polymer does not need to be in the caster for very long.

Conventional CMP pad manufacturing may include the formation of a cake or ingot of solid polymer that is sliced, which requires substantial uniformity from top to bottom, which is difficult. In contrast, in an exemplary method according to the present technology using centrifugal casting, the solid homogenous polymer produced is extremely flat and only a bare minimum thicker than the ultimate thickness of the pad. A very large belt is produced that can be used to make many top pads by cutting or punching by any appropriate method, which enables a high throughput along with a very consistent product and substantially nonexistent porosity.

The exemplary method disclosed herein may be utilized to form two or more separate and distinct layers by casting and gelling sequentially two or more different polymer mixtures. This embodiment is not possible in closed cast systems.

A reinforced pad may be formed using the present technology by placing a fiber network on the partially gelled initial polymer sheet and subsequently forming an additional layer on top of the network. Optimization of centrifugal caster settings allied with polymer mixture formulation allows for the formation of anisotropic polymer sheets. When using solid homogenous polymer polish pads this offers the benefit of a more consistent chain structure. This can enable more consistent micro texture formation with the pad conditioner. The transmission properties of the polymer sheet can be aided with this more regular structure.

An exemplary variation of the present technology utilizes improved adhesion between adhesive (pressure sensitive adhesive or hot melt adhesive) and polymer pad by making the drum interior slightly rough. Poor adhesion can result in pad delamination during polishing. This will result in damage to the polisher, scrap of the substrate being polished and significant downtime for the polisher, which will impact efficiency.

Figure 1:
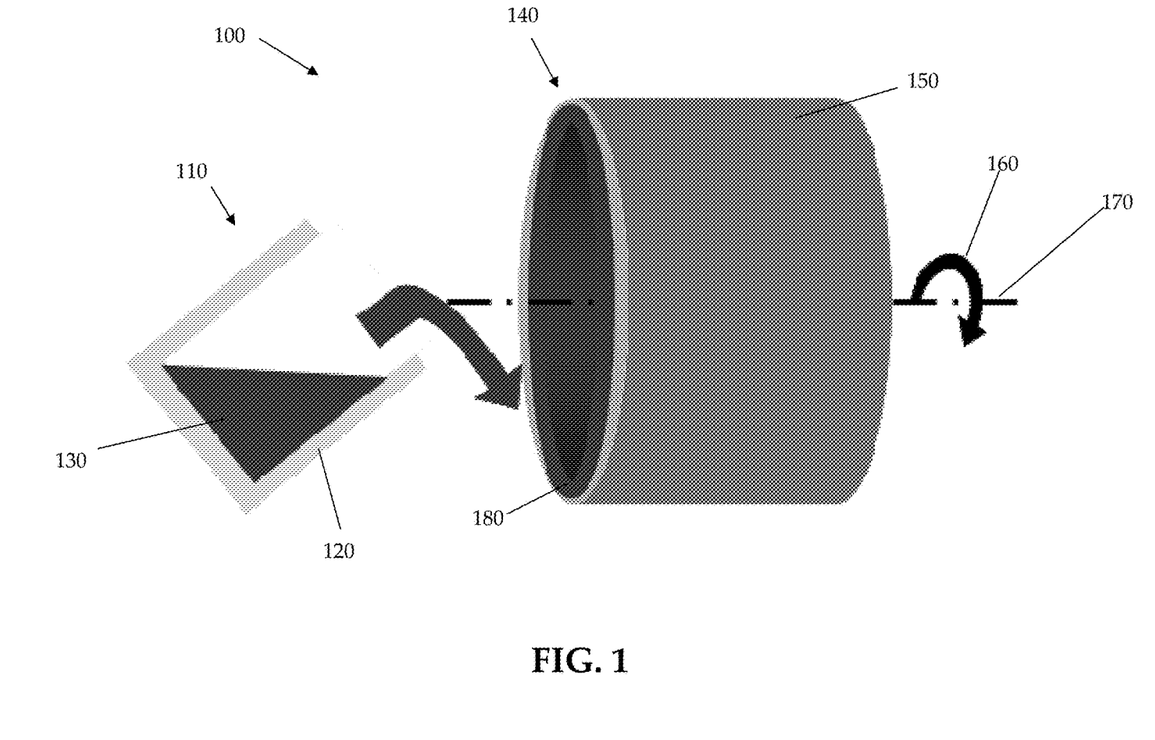
FIG. 1 is a schematic diagram illustrating an exemplary centrifugal caster system according to the present technology.

FIG. 1 is a schematic diagram illustrating centrifugal casting system 100 including polymer mixture container 110 and centrifugal caster 140. Polymer mixture container 110 contains polymer mixture 130. Polymer mixture container 110 may include a mixing apparatus and include jackets 120, which may be a heated element having conduits for heated fluid to flow through, and/or electrical heating elements. Polymer mixture 130 may be poured from polymer mixture container 110 into drum 150 of centrifugal caster 140 while drum 150 is spinning around axis 170 in rotational direction 160. Polymer mixture 130 may spread out to form polymer sheet 180 on an interior surface of drum 150 due to centrifugal force. In the case of drum 150, polymer sheet 180 may be cylindrical in shape. Drum 150 may spin, and may have a diameter such that at whatever rotational velocity drum 150 turns, the centrifugal force experienced by polymer mixture 130 after introduction into drum 150 is sufficient to create a uniform thickness of polymer sheet 180, and to additionally cause any pores in polymer mixture 130 to be forced away from the surface of polymer sheet 180 which interfaces with the drum 150 interior prior to gelling of polymer sheet 180. Drum 150 may be heated.

Drum 150 may have a smooth interior drum face, or alternatively may have a textured drum face that improves the performance of adhesives used in the polishing pad, that provides grooves to a surface of a polish pad made according to the method, and/or that facilitates the separation and/or forming of a polish pad from a gelled and casted polymer sheet formed by the method.

In exemplary embodiments, centrifugal caster 140 may include drum 150, and in alternative exemplary embodiments may instead include a mold connected by wires or shafts to a spinning interior element arranged in a vicinity of axis 170. The mold of centrifugal caster 140 may be a single mold or a plurality of molds, which may be fixed or removable and which may have a fixed or a variable distance from axis 170 to vary an amount of centrifugal force experienced by the polymer during the casting process. The mold or molds of centrifugal caster 140 may form an outline of a CMP pad, and may have a textured surface as discussed above in regard to drum 150.

Figure 2:
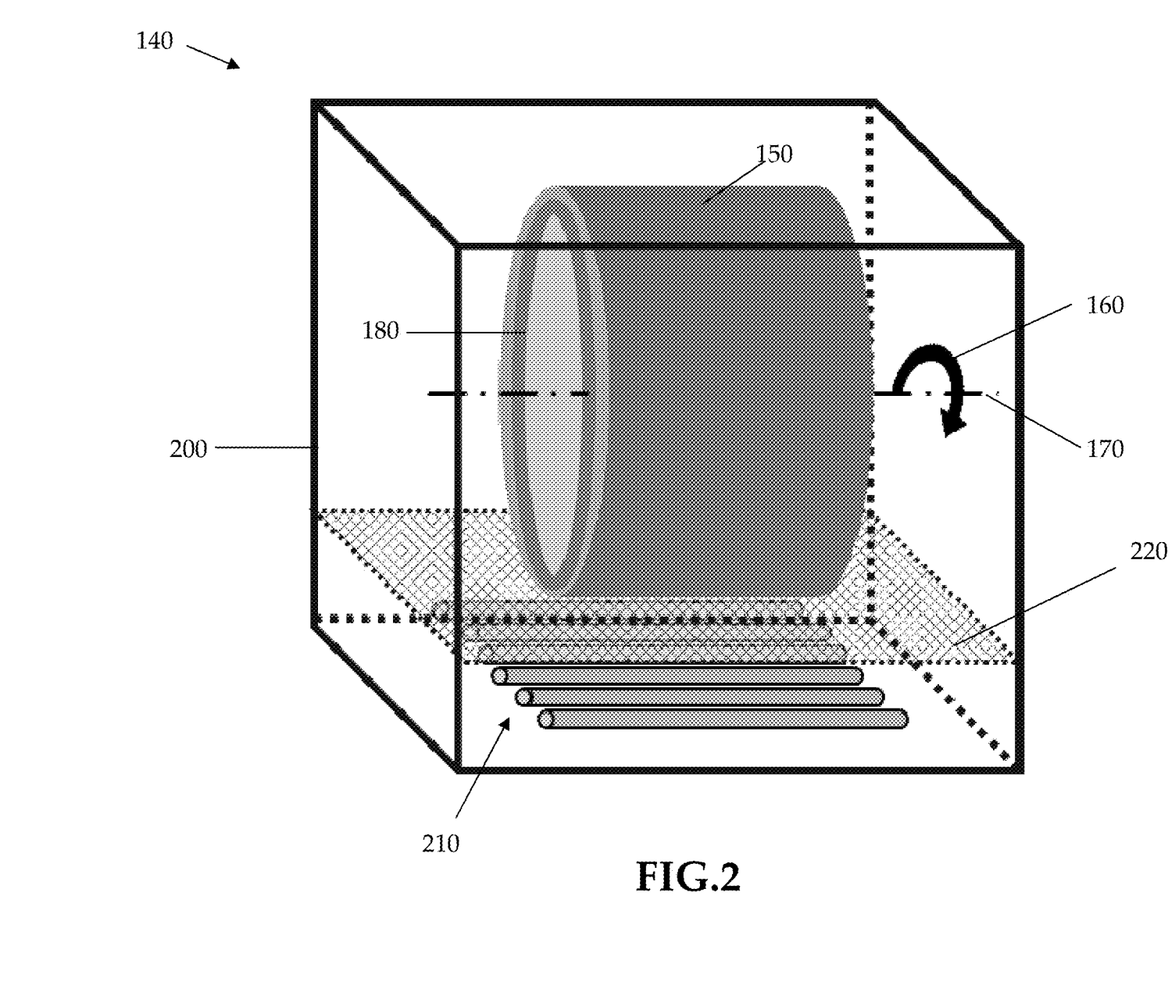
FIG. 2 is a schematic diagram illustrating the exemplary centrifugal caster shown in FIG. 1 according to the present technology.

FIG. 2 is a schematic diagram illustrating the centrifugal caster 140. Drum 150 is situated within container 200, which may be an insulated container or alternatively may instead be a frame for enabling drum 150 to spin around axis 170 in rotational direction 160. Centrifugal caster 140 may include heating elements 210, which may be arranged in an area below drum 150, may be arranged around drum 150, and/or may be incorporated into the body of drum 150. Heating elements 210 may be hot fluid conduits, electrical heating elements, or any other appropriate heating element including hot air blowers. Heat distributor 220 may be situated between heating elements 210 and drum 150 in order to promote the even distribution of heat to drum 150. Heating elements 210 may be used to heat drum 150 prior to pouring a polymer mixture into drum 150 in order to accelerate the gelling process to make polymer sheet 180. After polymer sheet 180 is formed, a second layer of the same or different polymer mixture or another material may be cast on top of polymer sheet 180 in order to make a multi-layer polymer pad. Subsequent layers may be formed by adding the same or different polymer mixture layers as described.

In still further embodiments, prior to pouring polymer mixture 130 into drum 150, a fiber layer may be installed or formed on the interior surface of drum 150. In this alternative method, a multi-layer polymer pad may be formed in a single or multiple castings. A multi-layer polymer pad may also be formed from a single polymer mixture 130 in a single casting operation when polymer mixture 130 includes particulate or undissolved elements having different densities.

After polymer sheet 180 is formed, drum 150 may be stopped and polymer sheet 180 may be removed from drum 150. Removing polymer sheet 180 may include cutting polymer sheet 180 along a line parallel to axis 170, causing polymer sheet 180 to change from a cylindrical belt shape to a rectangular shape. Polymer pads may be cut out or punched out of polymer sheet 180. Before or after forming an outline of the polymer pads, the surface of polymer sheet 180 may be machined to create a more uniform thickness and/or to remove any imperfections. Further, polymer sheet 180 may be machined either before or after forming an outline of the polymer pad to make a groove pattern on the surface of polymer sheet 180, and similarly the surface may be conditioned to form a scratch pattern on the polymer pad.

Figure 3:
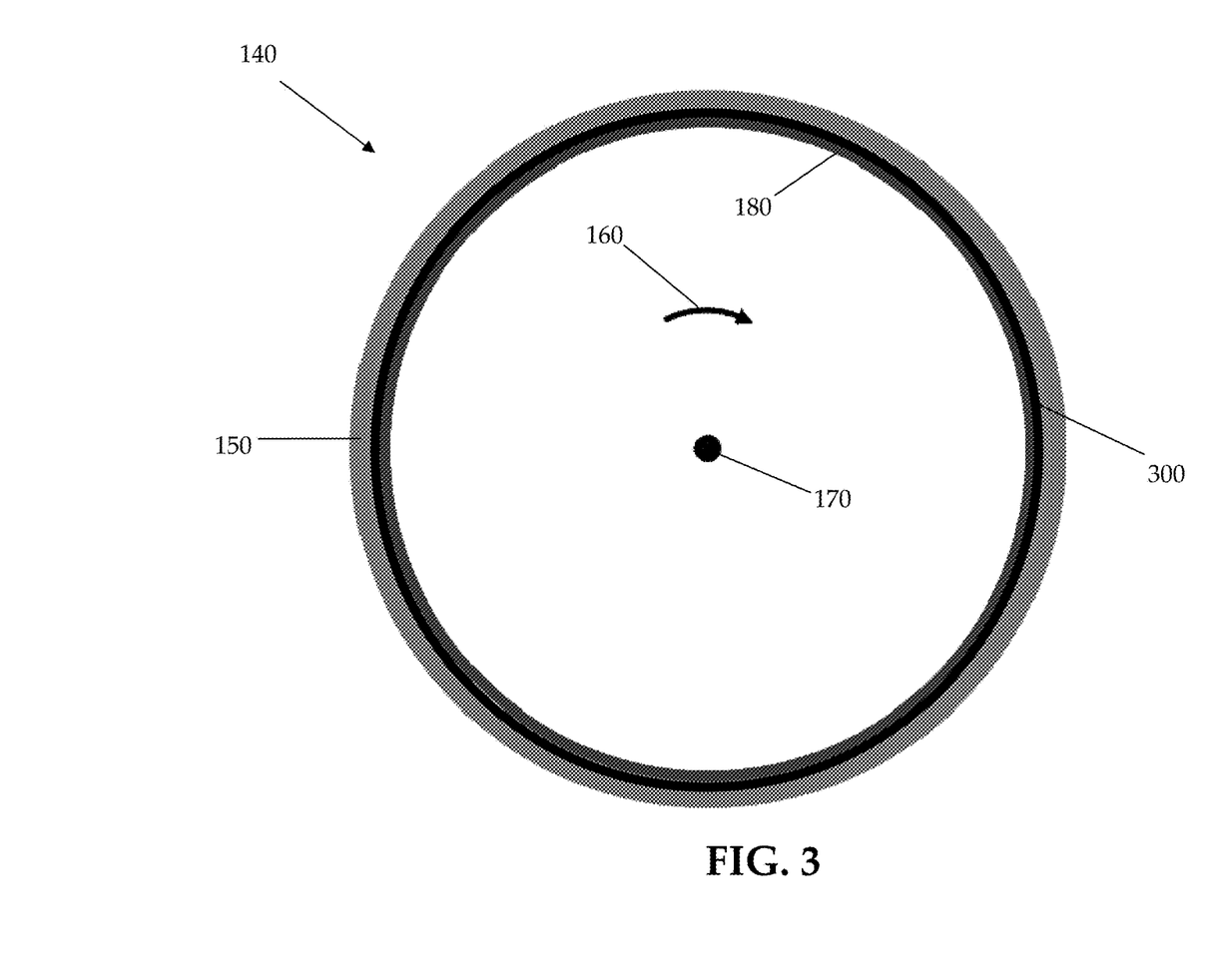
FIG. 3 is a schematic diagram illustrating a cross-section of the exemplary centrifugal caster shown in FIG. 2 and showing an exemplary mold release agent and polyurethane casting according to the present technology.

FIG. 3 is a schematic diagram illustrating a cross-section of centrifugal caster 140 and showing mold release agent 300 and polymer sheet 180. Drum 150 spins around axis 170 in rotational direction 160. Mold release agent 300 may be a permanent (e.g., Teflon®), semi-permanent (e.g., Teflon® spray), or temporary coating in the centrifugal caster in order to facilitate release of the solid polymer after casting. In particular, the interior surface of drum 150 may be sprayed with a Teflon® coating after a certain number of castings, for example after 20 castings. Additional considerations involved in casting the polymer sheet in the centrifugal caster include mold release.

In the method, the cylinder may rotate at more than 300 rotations per minute for at least a portion of a time of the rotating operation. A method of forming a polyurethane sheet (or other polymer sheet) from a very fast gelling prepolymer/curative mixture is provided. In this manner, a hard pad may be obtained with a higher manufacturing throughput, since the polyurethane (or other polymer) does not have to be in the caster for as long a time. Rapid mixing is possible using a centrifugal caster.

Figure 4:
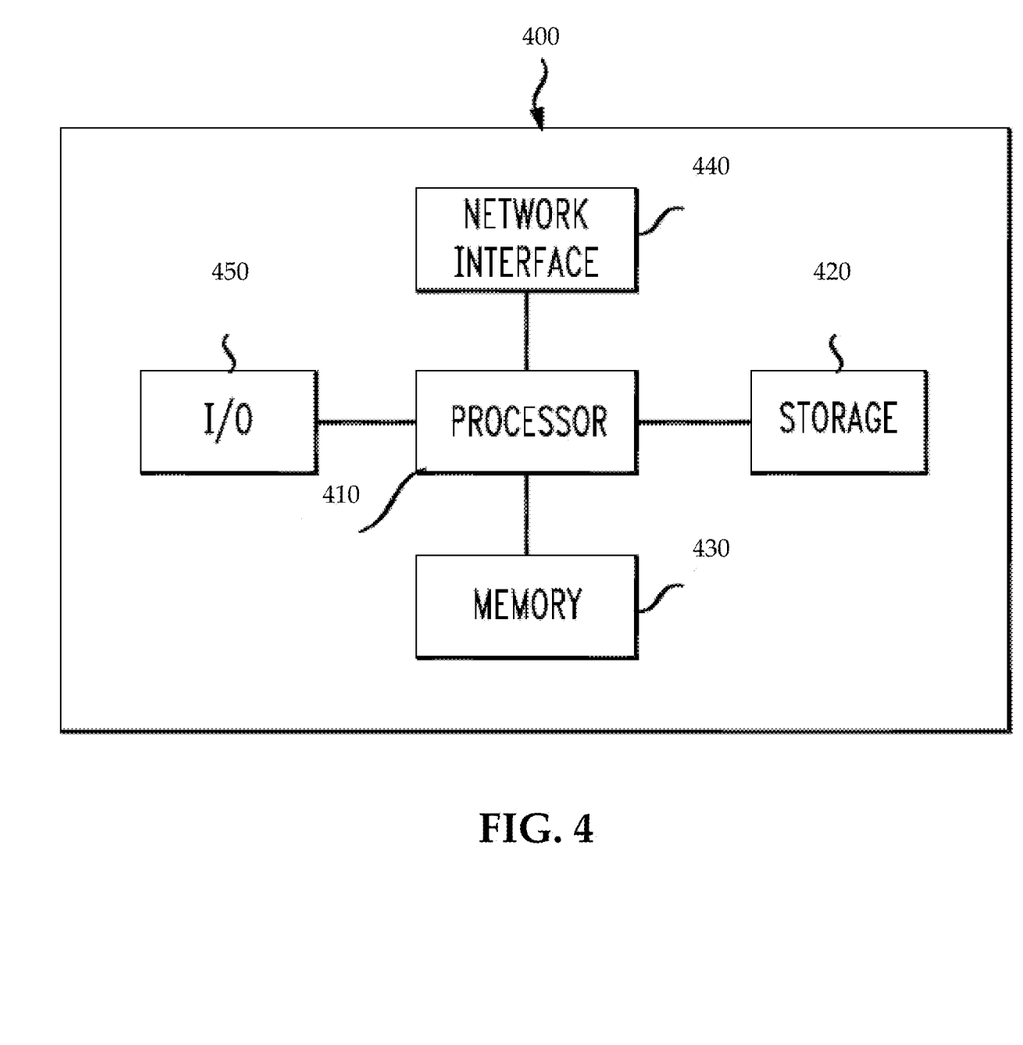
FIG. 4 illustrates a computer system according to an exemplary embodiment.

FIG. 4 illustrates a computer system according to an exemplary embodiment. Computer 400 may, for example, control elements of centrifugal casting system 100 and/or heating elements 210. Additionally, computer 400 can perform the steps described herein (e.g., with respect to FIG. 5). Computer 400 contains processor 410 which controls the operation of computer 400 by executing computer program instructions which define such operation, and which may be stored on a computer-readable recording medium. The computer program instructions may be stored in storage 420 (e.g., a magnetic disk, a database) and loaded into memory 430 when execution of the computer program instructions is desired. Thus, the computer operation will be defined by computer program instructions stored in memory 430 and/or storage 420 and computer 400 will be controlled by processor 410 executing the computer program instructions. Computer 400 also includes one or more network interfaces 440 for communicating with other devices, for example other computers, servers, or websites. Network interface 440 may, for example, be a local network, a wireless network, an intranet, or the Internet. Computer 400 also includes input/output 450, which represents devices which allow for user interaction with the computer 400 (e.g., display, keyboard, mouse, speakers, buttons, webcams, etc.). One skilled in the art will recognize that an implementation of an actual computer will contain other components as well, and that FIG. 4 is a high level representation of some of the components of such a computer for illustrative purposes.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Figure 5:
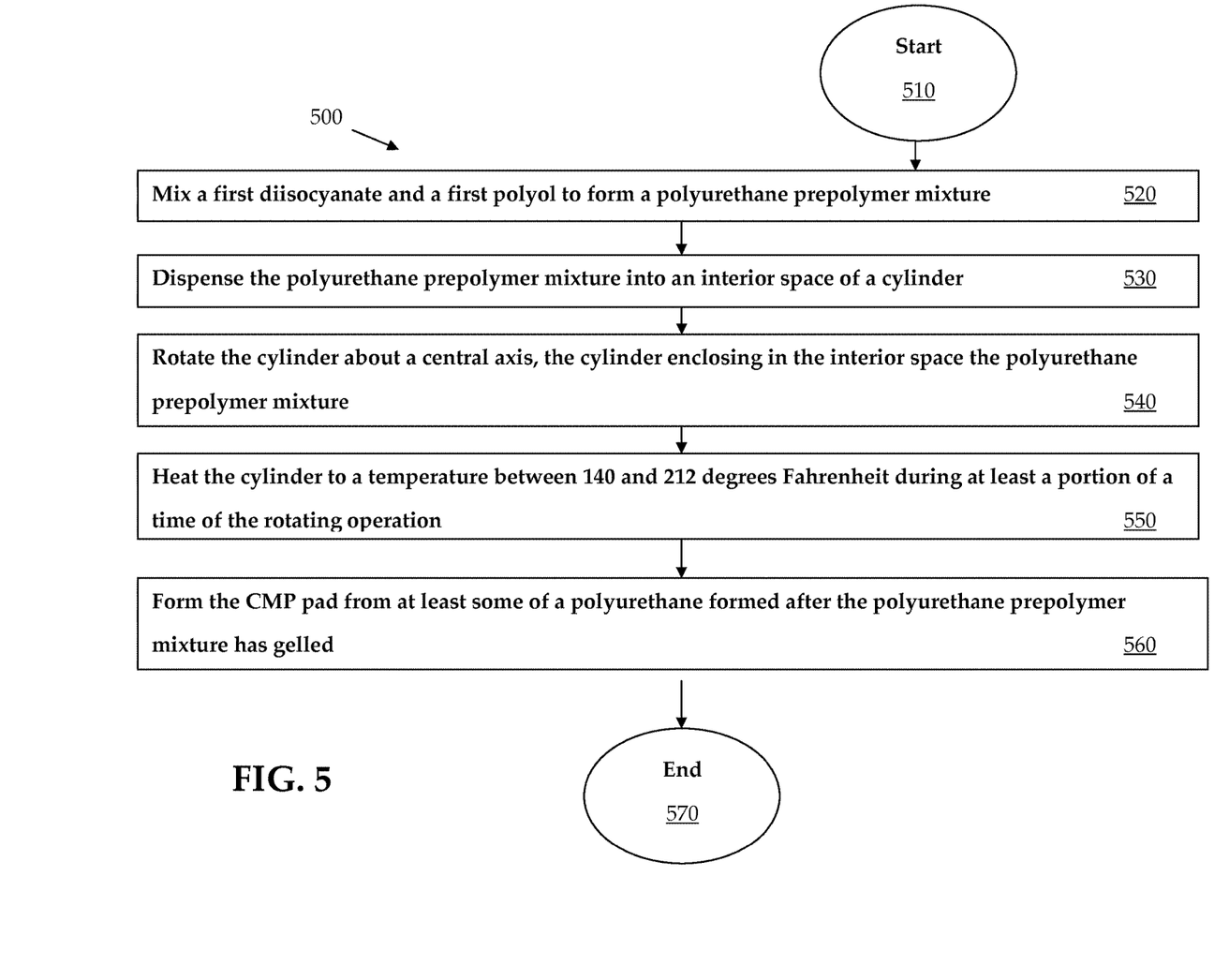
FIG. 5 is a flow chart illustrating an exemplary method for making a polishing pad according to the present technology.

FIG. 5 illustrates method 500 according to the present technology using polyurethane. However, the method is also applicable to other polymers, as discussed herein. Method 500 starts at start oval 510 and proceeds to operation 520, which indicates to mix a first diisocyanate and a first polyol to form a polyurethane prepolymer mixture. From operation 520, the flow proceeds to operation 530, which indicates to dispense the polyurethane prepolymer mixture into an interior space of a cylinder. From operation 530, the flow proceeds to operation 540, which indicates to rotate the cylinder about a central axis, the cylinder enclosing in the interior space the polyurethane prepolymer mixture. From operation 540, the flow proceeds to operation 550, which indicates to heat the cylinder to a temperature between 140 and 212 degrees Fahrenheit during at least a portion of a time of the rotating operation. From operation 550, the flow proceeds to operation 560, which indicates to form the polishing pad from at least some of a polyurethane formed after the polyurethane prepolymer mixture has gelled. From operation 560, the flow proceeds to end oval 570.

A polymer (for example a polyurethane, also referred to as PU) casting system may involve mixing a PU prepolymer (also referred to as a precursor) with a chain extender and a plasticizer. The prepolymer may be TDI (a diisocyanate) and a polyol, though other diisocyanates or other polyisocyanates may be used, and likewise other polyols may be used.

The ratios of TDI and a polyol may vary around a ratio of 2:1 molar ratio, such that the free, or unreacted isocyanate percentage varies from 2.5 to 9.5%. A chain extender, such as MOCA, may be added to the prepolymer at a molar ratio of around 1:1 with the unreacted isocyanate. For now mixing ratio is 0.95:1 for the MOCA to unreacted isocyanate.

In exemplary embodiments of the invention, a curative agent may be added to polyurethane prepolymer at a molar ratio of around 0.7 to 1.25:1 with the unreacted polyisocyanate to form a polyurethane precursor. For example, MOCA may be mixed with a polyurethane prepolymer at a ratio of 0.95:1 with the unreacted diisocyanate. A plasticizer may be added on a weight basis to the polyurethane prepolymer and the chain extender. The ratio of the plasticizer may range from 0% to 30% on a weight basis to the polyurethane prepolymer and the curative agent.

A large variety of plasticizers including sebacates, adipates, gluterates, phthalates, azelates, maleates and benzoates. For example, a benzoate such as Benzoflex™ may be used in an embodiment of the present invention. Plasticizers may be added on a weight basis to the above materials, and the ratios can be from 0 to 30%, and preferably in the 5 to 20% range.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for making a chemical mechanical planarization (CMP) polishing pad material for polishing semiconductor wafers using centrifugal casting, comprising:
    mixing a polyurethane prepolymer and a curative agent to form a polymer mixture;
    mixing a plasticizer to the polymer mixture, the plasticizer being Benzoflex and being added to the polymer mixture at a weight basis of between 5 percent and 20 percent of the polymer mixture;
    centrifugal casting by rotating a cylinder about a central axis;
    introducing the polymer mixture with voids into an interior space enclosed within the cylinder by a dispenser unattached to the cylinder, the polymer mixture having begun to react without exceeding a pot life of the polymer mixture, centrifugal force from the centrifugal casting creating a uniform layer of the polymer mixture on a surface of an inner side wall of the cylinder and the centrifugal casting by the rotating of the cylinder about the central axis isolating the voids in the polymer mixture at an outer surface, the outer surface being opposite from the surface of the inner side wall of the cylinder, wherein the dispenser includes jackets comprising conduits for heated fluid to flow through;
    heating the cylinder using at least one heating element situated beneath the cylinder;
    evenly distributing heat to the cylinder using at least one heat distributor disposed between the at least one heating element and the cylinder;
    forming a first layer via gelling of the polymer mixture, the first layer being a solid nonporous, homogenous polymer sheet;
    forming a second layer by introducing into the cylinder an additional polymer mixture in direct contact with the first layer, centrifugal casting the additional polymer mixture by rotating the cylinder about the central axis, the additional polymer mixture being the same or different from the polymer mixture which forms the first layer;

removing the first layer and the second layer from the cylinder; and shaping a plurality of nonporous and uniformly thick multi-layer CMP polishing pads for polishing the semiconductor wafers from the first layer and the second layer.

2. The method of claim 1, wherein the rotating of the cylinder is continued until the polymer mixture and the additional polymer mixture have gelled.

3. The method of claim 1, wherein the first layer and the second layer are distinct layers in the polishing pad formed by sequentially casting and gelling the polymer mixture and the additional polymer mixture.

4. The method of claim 1, further comprising heating the cylinder to a temperature between 50 and 500 degrees Fahrenheit during the rotating of the cylinder.

5. The method of claim 1, wherein the polymer mixture comprises at least one of a polyurethane, a polyuria-urethane, a polycarbonate, a polyamide, a polyacrylate and a polyester.

6. The method of claim 1, further comprising:

mixing at least one of a diisocyanate, a di-functional isocyanate and a polyfunctional isocyanate with a first polyol to form the polymer mixture; and dispensing the polymer mixture into the interior space of the cylinder.

7. The method of claim 6, further comprising adding at least one of filler, microelements, abrasives, fibers, surfactants and a plasticizer into the polymer mixture.

8. The method of claim 6, further comprising treating a surface of the innerwall of the cylinder with a mold release agent prior to dispensing the polymer mixture into the interior space.

9. The method of claim 1, further comprising removing at least some of the polymer mixture from the interior space of the cylinder after the polymer mixture has gelled.

10. The method of claim 1, wherein forming the first layer further comprises:

machining away the voids in the polymer sheet, resulting in the solid nonporous, homogenous polymer sheet.

11. The method of claim 1, wherein the rotating of the cylinder comprises rotating the cylinder about the central axis at a speed of between 150 and 500 rotations per minute.

12. The method of claim 1, wherein the heating of the cylinder using the at least one heating element occurs prior to introducing the polymer mixture to the cylinder in order to control the gelling of the polymer sheet.

13. The method of claim 1, wherein the polymer mixture comprises a polyurethane prepolymer with a chain extender and a plasticizer.

14. A system for manufacturing a chemical mechanical planarization (CMP) polishing pad material for polishing semiconductor wafers using centrifugal casting, comprising:

a polymer mixture with voids, the polymer mixture having begun to react without exceeding a pot life of the polymer mixture;

a dispenser adapted to introduce the polymer mixture with the voids into a centrifugal caster, the dispenser being unattached to the centrifugal caster, wherein the dispenser includes jackets comprising conduits for heated fluid to flow through;

the centrifugal caster comprising a drum, the drum having an interior wall and defining a cylindrical interior space and adapted to rotate about a central axis at a rotational velocity, centrifugal force from rotating of the drum of the centrifugal caster about the central axis forming a single homogenous nonporous layer against a surface of the interior wall of the drum and the centrifugal force further isolating the voids in the polymer mixture at an outer surface, the outer surface being opposite from the interior wall of the drum;

at least one heating element situated beneath the drum for heating the polymer mixture; and at least one heat distributor disposed between the at least one heating element and the drum for promoting even distribution of heat to the drum.

15. The system of claim 14, further comprising a mixer adapted to mix a prepolymer and a curative to the polymer mixture.

16. The system of claim 14, wherein the at least one heating element comprises at least one of hot fluid conduits, electrical heating elements, and hot air blowers.

17. The system of claim 14, wherein a surface of the cylindrical interior space includes a texture adapted to impart to the polymer mixture a perforation delineating an outer edge of the polishing pad.

18. The system of claim 14, wherein the at least one heating element comprises an electrical heating element.

19. A system for manufacturing a chemical mechanical planarization (CMP) polishing pad material for polishing semiconductor wafers using centrifugal casting, comprising:

a polymer mixture with voids, the polymer mixture with voids having begun to react without exceeding a pot life of the polymer mixture;

a dispenser adapted to introduce the polymer mixture with voids into a centrifugal caster, the dispenser being unattached to the centrifugal caster, wherein the dispenser includes jackets comprising conduits for heated fluid to flow through;

the centrifugal caster comprising a drum, the drum having an interior wall and defining a cylindrical interior space and adapted to rotate about a central axis at a rotational velocity, centrifugal force from rotating of the drum of the centrifugal caster about the central axis forming a single homogenous nonporous layer against a surface of the interior wall of the drum and the centrifugal force further isolating the voids in the polymer mixture at an outer surface, the outer surface being opposite from the interior wall of the drum;

at least one heating element situated beneath the drum for heating the polymer mixture;

at least one heat distributor disposed between the at least one heating element and the drum for promoting even distribution of heat to the drum; and a computer communicatively coupled to the centrifugal caster and to the at least one heating element, the computer storing computer program instructions on a computer-readable medium to perform operations comprising adjusting the rotational velocity of the centrifugal caster and temperature of the at least one heating element.

20. The system of claim 19, further comprising a mixer adapted to mix a prepolymer and a curative to form the polymer mixture.

21. The system of claim 19, wherein the at least one heating element comprises at least one of hot fluid conduits, electrical heating elements, and hot air blowers.

* * * * *